June 1, 1965  F. KAISER  3,186,271
PROCESS AND APPARATUS FOR THE PRODUCTION OF ONE-PIECE SHAPED
ARTICLES OF ELASTICALLY DEFORMABLE MATERIAL
Filed June 29, 1962  2 Sheets-Sheet 1
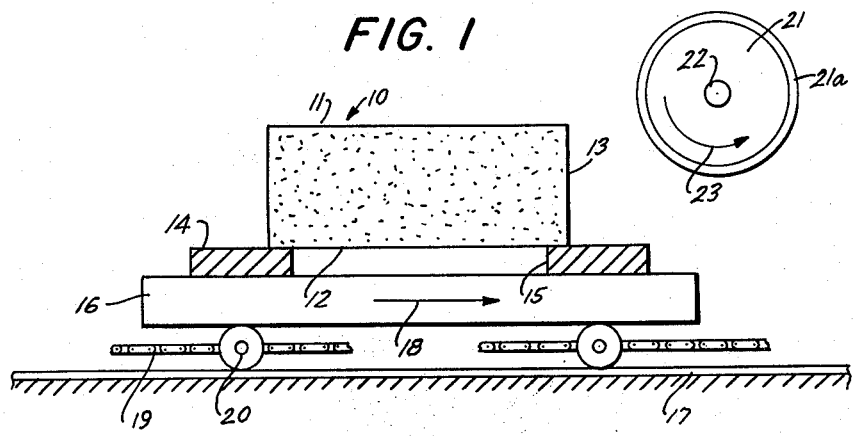
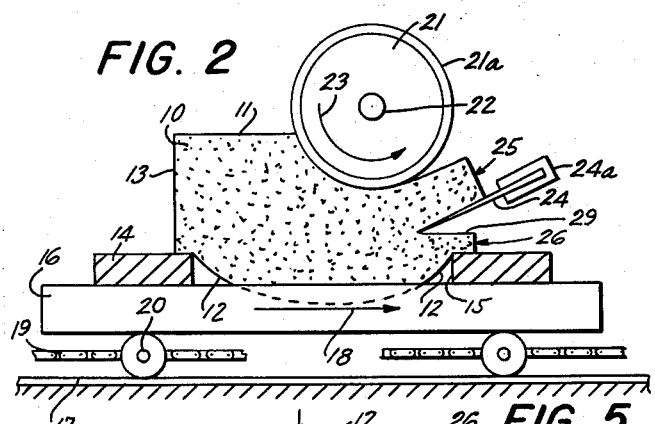
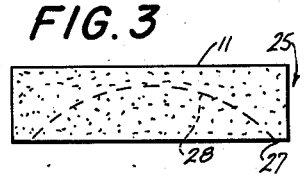
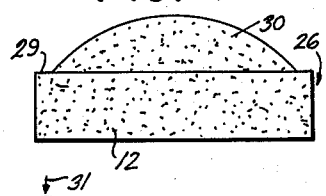
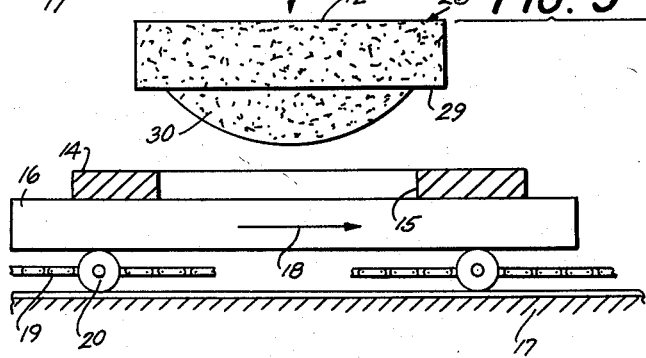
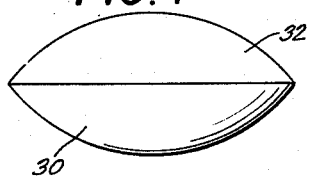
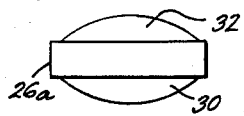
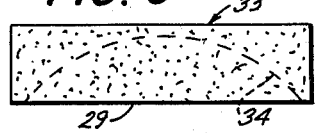
INVENTOR:
FRITZ KAISER
BY
Michael J. Striker
his ATTORNEY June 1, 1965  F. KAISER  3,186,271
PROCESS AND APPARATUS FOR THE PRODUCTION OF ONE-PIECE SHAPED
ARTICLES OF ELASTICALLY DEFORMABLE MATERIAL
Filed June 29, 1962  2 Sheets-Sheet 2

INVENTOR:
FRITZ KAISER
BY
Michael S. Striker
his ATTORNEY

United States Patent Office 3,186,271
Patented June 1, 1965

3,186,271
PROCESS AND APPARATUS FOR THE PRODUCTION OF ONE-PIECE SHAPED ARTICLES OF ELASTICALLY DEFORMABLE MATERIAL
Fritz Kaiser, Ramschied uber Bad Schwalbach, Germany
Filed June 29, 1962, Ser. No. 206,322
Claims priority, application Germany, July 8, 1961,
K 44,198
13 Claims. (Cl. 83—4)

The present invention relates to the production of shaped articles which consist of foamed plastic and similar elastically deformable substances, and more particularly to a process and apparatus for the production of homogeneous one-piece shaped articles. For example, the articles manufactured in accordance with the process of my invention may be utilized as toys, as shockproof containers or cushions for fragile items, as sponges for use in households, laundries, garages and similar institutions, as decorative items, and for many other purposes.

It is an important object of the present invention to provide a novel process for mass-manufacture of shaped articles with regular or irregular outline and for mass-manufacture of such articles from slabs and similar workpieces consisting of elastically deformable material. As far as I am informed at this time, I am first to provide a process according to which a shaped article can be produced in two rather than in three stages.

Another object of the invention is to provide a process of the just outlined characteristics according to which a large number of articles may be produced in a simultaneous operation.

A further object of the invention is to provide a process for the production of shaped articles from slab- or sheet-shaped workpieces of the type having two opposed surfaces and a peripheral face between such surfaces, according to which one or more shaped articles may be carved out of such workpieces in such a way that the remainder of each workpiece also assumes the form of a shaped article which may be used for packaging of fragile items, as a heat-insulating liner and for many other purposes.

A concomitant object of the invention is to provide a novel apparatus for the practice of my process.

Still another object of the invention is to provide an apparatus wherein shaped articles of regular or irregular outline may be produced while a workpiece is caused to travel only twice through the apparatus or while the apparatus is caused to move only twice along the workpiece.

An additional object of the invention is to provide a novel die for use in the apparatus of the just outlined characteristics, and to provide a novel deforming device which cooperates with the die to compress selected portions of elastically deformable workpieces during each stage of the shaping operation.

A further object of the instant invention is to provide an apparatus for the production of shaped articles from elastically deformable slabs or sheets which consist of foamed plastic material, the apparatus being constructed and assembled in such a way that it may be rapidly converted for production of symmetrical or unsymmetrical workpieces whose surfaces are mirror images of each other or whose surfaces are of different configuration.

An additional object of the invention is to provide an exceptionally compact apparatus of the above outlined characteristics whose outline need not substantially exceed the outline of a workpiece.

With the above objects in view, the invention resides in the provision of a process for the production of shaped articles with a predetermined outline from elastically deformable workpieces or slabs of the type having two opposed surfaces and a peripheral face intermediate such surfaces. This process comprises the steps of applying constant pressure of unchanging magnitude to one surface of a workpiece and permitting the other surface to yield to such constant pressure within an outline which corresponds to desired outline of the article, and slitting the workpiece by forming in the peripheral face thereof a cut which divides the workpiece into a pair of sections the first of which has one surface of the original workpiece and a second surface located opposite this one surface and provided with a cavity, and the second of which has the other surface of the original workpiece and an additional surface located opposite this other surface and provided with a projection which is complementary to the cavity and whose outline corresponds to the desired outline of the article. In a subsequent step, constant pressure of unchanging magnitude is applied against the other side of the second section whereas the projection of this second section is permitted to yield to such constant pressure, and a second cut is formed in the plane of the aforementioned additional surface to separate the projection and a portion of the remainder of the second section from the second section. Such portion of the second section may be a mirror image of the projection so that the ultimate product is a symmetric article consisting of two integral halves which are mirror images of each other. It is equally possible to restrict the deformation of the original workpiece and/or of the second section so that the outer surface of the portion carved out of the second section need not be similar to the outer surface of the projection.

In its elementary form, the apparatus of my invention comprises a female die having at least one opening whose outline corresponds to the desired outline of the ultimate product and this die is adapted to support a workpiece in such a way that one surface of the workpiece covers the opening, deforming means for applying constant pressure of unchanging magnitude to the other surface of the workpiece whereby that portion of the workpiece which covers the opening yields and penetrates into the interior of the die, and cutter means for forming a slit in the peripheral face and in a cutting plane which is located between the surfaces of the workpiece while that portion of the workpiece which covers the opening penetrates into the die whereby the workpiece is automatically subdivided into a pair of sections one of which is provided with a projection having the outline of the ultimate product and the other of which is provided with a cavity which is complementary to the projection. The projection is thereupon introduced into the opening of the female die and the one section is deformed to cause some of its material to penetrate into the opening in addition to the projection whereby, after a second cut is formed in such section, the projection and a portion of the remainder of this section are separated as a unitary one-piece article.

The novel features which are considered as characteristic of the invention are set forth in particular in the appended claims. The invention itself, however, both as to its construction and its method of operation, together with additional objects and advantages thereof, will be best understood from the following detailed description of certain specific embodiments with reference to the accompanying drawings, in which;

FIG. 1 is a schematic side-elevational view of an apparatus which embodies one form of my invention and which is utilized for the production of lenticular articles, the apparatus being shown in a position its parts assume prior to forming a first cut in the peripheral face of a slab-like workpiece which consists of foamed plastic material;

FIG. 2 is a similar view of the apparatus which is shown in a position when its cutter forms a slit in the peripheral face of the workpiece;

FIG. 3 illustrates one section of the workpiece which is obtained after forming in the peripheral face of the workpiece a slit in a manner as shown in FIG. 2;

FIG. 4 illustrates the other section of the workpiece;

FIG. 5 is a side elevational view of the apparatus which is shown in a position its parts assume when a cut or slit is formed in the section shown in FIG. 4;

FIG. 6 illustrates the remainder of the other section after the apparatus has formed therein a slit in a manner as shown in FIG. 5;

FIG. 7 illustrates a lenticular article;

FIG. 7a illustrates a different article;

Figure 12:
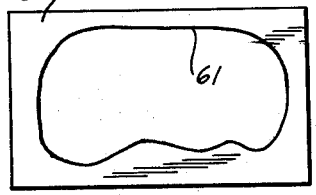
FIG. 12 illustrates a different female die which is formed with an opening of irregular outline resembling the outline of a naturally occurring sponge.
Figure 13:
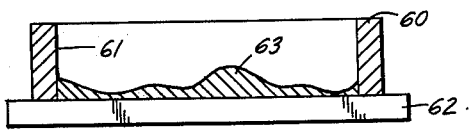
Figure 14:
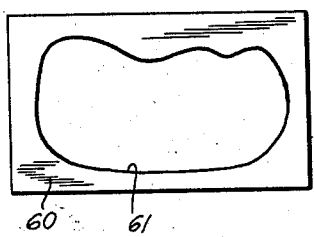

FIG. 13 is a longitudinal central section through the female die of FIG. 12, this die being shown in operative position on a stationary or movable support while it accommodates a specially configurated insert which is received in the opening of the die and which determines the extent of deformation of a workpiece while the peripheral face of the workpiece is subjected to the action of a cutting device;

FIG. 14 illustrates the female die of FIG. 12 in inverted position; and

Figure 15:
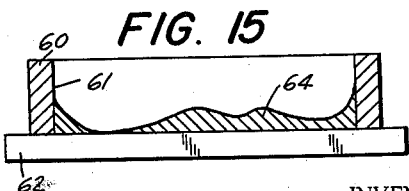

FIG. 15 is a longitudinal central section through the die in inverted position, further showing a different insert which determines the extent of deformation of a section during the second cutting or trimming step.

Referring now in greater detail to the illustrated embodiments, and first to FIG. 1, there is shown an apparatus which is utilized for trimming and for thereby transforming a workpiece 10 into at least one article of lenticular shape. The workpiece 10 consists of elastically deformable material, preferably plastic (e.g., foamed polystyrene or foamed polyester), and assumes the shape of a flat slab having two opposed surfaces 11, 12 and a peripheral face 13.

The apparatus comprises a female mold member or die 14 which is formed with a circular or oval opening 15, the outline of this opening corresponding to the desired outline of the ultimate article. The die 14 is supported by a conveyance here shown as a wheel-mounted dolly 16 which travels along suitable guide means 17 and which is driven at a given speed in a direction indicated by the arrow 18. The means for moving the dolly 16 at such given speed comprises a chain or cable 19 which is fixed to the wheel shafts 20. The flat upper side or surface of the die 14 is adapted to support the workpiece 10 in such a way that the surface 12 of the workpiece covers the opening 15 (see FIG. 2).

The apparatus further comprises a deforming or pressure applying means which assumes the shape of a roller 21 and which is driven by a coaxial shaft 22 at a peripheral speed corresponding to the given forward speed of the dolly 16. For example, the apparatus may comprise a single motor which drives the roller 21 and which also drives the dolly 16 through a suitable speed-synchronizing mechanism or the like. The direction in which the roller 21 is driven is indicated by an arrow 23. If the workpiece consists of foamed plastic or a similar elastically deformable material, the roller 21 is preferably provided with a friction-generating peripheral layer 21a of rubber or the like. It is not always necessary to drive the roller 21 because this roller will be driven automatically when its layer 24 is engaged by the surface 11. The roller 21 is mounted in such a way that its axis of rotation is perpendicular to the direction in which the dolly 16 is movable along the guide means 17 and that the lowermost portion of this roller is spaced from the upper side of the die 14 through a distance which is less than the thickness of the workpiece 10. Consequently, when the dolly 16 entrains the workpiece in a direciton to the right, as viewed in FIG. 2, the surface 11 of the workpiece is subjected to constant pressure of unchanging magnitude whereby a portion of the surface 12 yields and some material of the workpiece penetrates into the opening 15. A reciprocatory or rotary cutter means in the form of an inclined flat blade 24 (see FIG. 2) is located in the path of the workpiece immediately past the rollers 21, and the cutting edge of this blade engages the peripheral face 13 along a line located between the surfaces 11, 12 to form a slit in the workpiece in a cutting plane located midway between the surfaces 11, 12 and to thereby subdivide the workpiece into a pair of sections 25, 26 which are respectively shown in FIGS. 3 and 4. The cutting plane is parallel with the flat upper surface of the die 14. It will be noted that the section 25 has a surface 11 which is the same as the upper surface of the original workpiece, a second surface 27 which is formed by the blade 25, and a semilenticular cavity 28 which is provided in the second surface 27. On the other hand, the second section 26 has a surface 12 which is the same as the lower surface of the original workpiece, an additional surface 29 which is formed by the blade 25, and a semilenticular projection 30 which is complementary to the cavity 28 and whose outline corresponds to the outline of the opening 15, i.e., to the desired outline of the ultimate product.

The sections 25, 26 may be utilized as shockproof cushions for packaging of concavo-convex goods made of glass, china or other brittle material, as well as for protecting precision-finished surfaces of metallic and similar objects. In such instances, substantial savings may be achieved if the thickness of the workpiece exceeds only slightly the distance between the surfaces 11 and 27, i.e., if the distance between the surfaces 12, 29 is minimal.

FIG. 5 illustrates the apparatus of FIGS. 1 and 2 in a position its parts assume when the section 26 is subjected to a further trimming action in order to obtain a lenticular article of the type shown in FIG. 7. In the first step, the dolly 16 is returned to the position of FIG. 1 and the section 26 is placed onto the die 14 in such a way that the projection 30 enters the opening 15 and that the surface 29 rests on the upper side of the female die. The roller 21 is shifted toward the plane of the dolly 16 (arrow 31) so that its lowermost point is spaced only slightly from the upper side of the die 14 (i.e., the shortest distance between the upper side of the die 14 and the lowermost point of the roller 21 is then less than the distance between the surfaces 12, 29 on the section 26). The blade 24 is moved into the plane of the surface 29 and the dolly is caused to move in the direction indicated by the arrow 18 so that the roller 21 applies pressure against the surface 12 to force some material of the section 26 into the opening 15 (i.e., such material which is located at a level above the surface 29 when the section 26 is not compressed) and that the blade 24 forms a cut in and separates from the section 26 a semilenticular portion 32 (see FIG. 7) which is integral with and which is mirror symmetrical to the projection 30. The remainder 33 of the section 26 then assumes a configuration as shown in FIG. 6, and it will be noted that this remainder 33 is identical with the section 25, i.e., its surface 29 is now provided with a cavity 34 which is complementary to the semilenticular portion 32.

It goes without saying that the apparatus of my invention may utilize a female die which is formed with one or more rows of openings 15 and that the axial length of the roller 21 is then selected in such a way that it can simultaneously compress several zones of a workpiece in order to enable the cutter means 24 to simultaneously form a large number of projections 30 in a first step and an equal number of shaped articles 30, 32 in a subsequent step.

In many instances, foamed workpieces of plastic material are furnished in sizes of 1 x 2 m. or thereabouts. If the ultimate product 30, 32 is a plastic sponge for household use, a very large number of such sponges may be cut from a single slab and the female die 14 is then provided with a large number of openings 15 which are sufficiently close to each other to insure that waste is reduced to a minimum.

Referring again to FIG. 2, it will be noted that the plane of the blade 24 makes an acute angle with the plane of the surface 12 when the blade forms a cut in the peripheral face 13. This is of considerable advantage because the material of the section 26 has room to expand immediately beyond the cutting edge of the blade so that the likelihood of damage to the section 26 is very remote.

Of course, the apparatus of FIGS. 1, 2 and 5 may be used for manufacture of homogenous lenticular articles which are provided with a circumferential bead or collar merely by forming the second cut slightly above the surface 29, as viewed in FIG. 5. An article of such configuration is shown in FIG. 7a, and it will be noted that the projections 30, 32 are separated by a collar 26a which is rectangular if the original workpiece is of rectangular shape.

Figure 8:
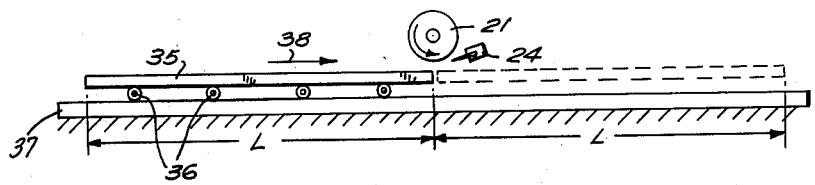
FIG. 8 is a side elevational view of a slightly different apparatus wherein a wheel-mounted female die is movable with respect to a stationary deforming roller.

FIG. 8 shows a slightly modified apparatus in which the carriage 16 is omitted and in which a female die 35 is mounted on a series of wheels 36 so that it may travel along elongated guide means 37. The deforming means again assumes the shape of a rotary roller 21 which is adjacent to the leading edge of the die 35 when the latter is returned to its initial position at the left-hand end of the guide means 37. The length L of the die 35 approximates one-half the total length of the guide means 37. The cutter 24 is located immediately past the roller 21, as seen in the direction of the arrow 38.

Figure 9:
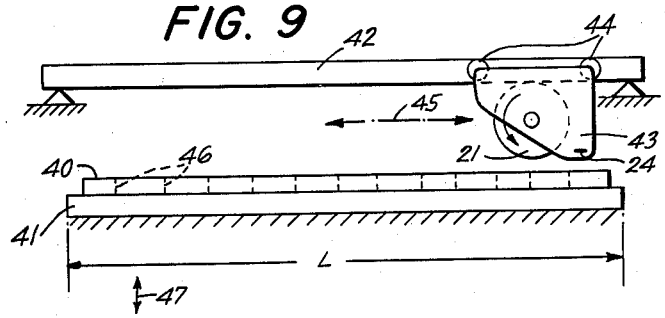
FIG. 9 is a side elevational view of a modified apparatus wherein a carriage provided with a deforming roller and with a cutter is caused to reciprocate along the upper side of a stationary female die.

FIG. 9 illustrates another apparatus which constitutes a modification of the apparatus shown in FIGS. 1 and 8. A female die 40 is fixedly mounted on a base or support 41, and this die is located beneath an elongated overhead guideway or rail 42 which is provided with tracks for the rollers 44 of a carriage or trolley 43. This trolley is reciprocable in directions indicated by the double-headed arrow 45 and carries a roller 21 and a cutter 24. When the trolley 43 moves in a direction to the left, as viewed in FIG. 8, the cutter 24 performs a working stroke and forms a slit in a workpiece which is placed onto the die 40. The roller 21 travels ahead of the cutter 24 and depresses selected portions of the workpiece into openings 46 provided in the die member 40 so that the edge of the cutter 24 forms a series of projections 30 during a single pass along the upper side of the die. The base 41 is adjustable in directions indicated by the double-headed arrow 47 so that, after the cutter 24 has completed a working stroke and after the trolley 43 returns to the position of FIG. 9, that section of the workpiece which is formed with projections 30 may be inverted in order to introduce the projections into the openings 46, whereupon the roller 21 and the cutter 24 perform a second working stroke in the same manner as described in connection with FIG. 5 to separate from the section supported by the die 40 a series of lenticular articles in a single pass along the die.

An important advantage of the apparatus shown in FIG. 9 is that the overall length L of the supporting means 41 need not exceed the length of the female die 40. In other words, and if compared with the apparatus of FIG. 8, the length of the entire assembly is reduced by 50 percent merely by utilizing a stationary die and by causing the roller 21 and cutter 24 to reciprocate along the die. As explained hereinabove, foamed slabs of plastic material often come in sizes of 1 x 2 meters so that savings in space achieved with the apparatus of FIG. 9 are considerable and that two such apparatus may be accommodated in a space necessary for accommodation of the apparatus shown in FIG. 8. In other words, if the length of the base 37 in the apparatus of FIG. 8 is 4 m., the length L of the base 41 shown in FIG. 9 need not exceed 2 m.

Figure 10:
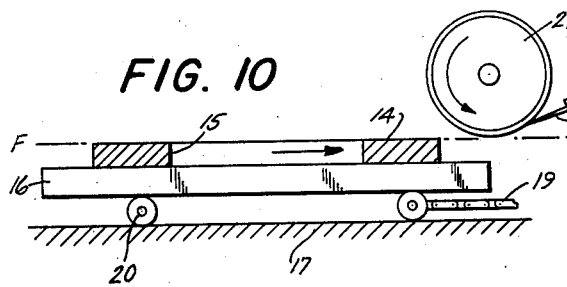
FIG. 10 illustrates the apparatus of FIGS. 1, 2 and 5 in a position its parts assume before a cut is formed in the other section of a workpiece, this apparatus utilizing a cutter whose plane is inclined with respect to the plane of the female die.

FIG. 10 shows a slight modification of the apparatus which was described in connection with FIG. 5. All parts of this modified apparatus are identical with the parts shown in FIG. 5, excepting that the cutter 24 is located in an inclined plane so that its cutting edge extends into close proximity of a plane F—F, the latter coinciding with the plane of the upper side of the female die 14. The inclination of the cutter 24 is selected in such a way that there is room for sections 33 (see FIG. 6) which pass between the upper side of the cutter and the adjacent portion of the roller 21, and that there is also room for the articles 30, 32 which pass between the upper side of the die 14 and the underside of the cutter 24. Such mounting of the cutter when the section 26 is transformed into a section 33 and into one or more lenticular articles 30, 32 is of considerable advantage because it has been found that the support 24a of the cutter can damage a sensitive elastic material if the blade is located in the plane F—F, i.e. if this cutter is mounted in a manner as shown in FIG. 4.

Figure 11:
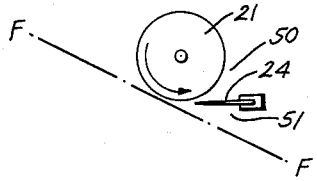
FIG. 11 illustrates a modification of the apparatus shown in FIG. 10, this apparatus having a cutter which is located in a horizontal plane and a female die which is reciprocable in an inclined plane.

FIG. 11 illustrates a different solution which is analogous to that shown in FIG. 10. In FIG. 11, the cutter 24 is located in a horizontal plane but the plane F—F of the upper side of the female die 14 (not shown in FIG. 11) is inclined with respect to the plane of the cutter so that the wedge-shaped spaces 50, 51 at the opposite sides of the cutter 24 respectively permit passage of a waste section (such as the section 33 shown in FIG. 6) and of lenticular articles (such as the article 30, 32 of FIG. 7).

FIG. 12 illustrates a different female die 60 which is utilized in the production of unsymmetrical articles, for example, of foamed articles which resemble naturally occurring irregularly configurated sponges. This die 60 is formed with an opening 61 of irregular outline resembling the outline of the ultimate article and, when in use, the die 60 may be placed onto a stationary support 62 corresponding to the support 41 of FIG. 9. The opening 61 then receives an irregular insert 63 (see FIG. 13) which determines the extent to which an elastically deformable workpiece may penetrate into the die 60 when the workpiece is deformed by a roller or the like such as the roller 21 shown in FIG. 9. When the first stage of the trimming operation is completed, the operator removes the insert 63, and he thereupon inverts the die 60 (see FIG. 14) and introduces into the opening 61 a different insert 64 (FIG. 15) before placing one section of the partially trimmed workpiece onto the die so that the projection of such section penetrates into the opening 61 to the extent determined by the insert 64. In the next pass, the cutter removes from such section an ultimate article whose outline corresponds to the outline of the opening 61 shown in FIGS. 12 and 14, one surface of which corresponds to the outline of the insert 63 shown in FIG. 13, and the other surface of which corresponds to the outline of the insert 64 shown in FIG. 15.

The inserts 63, 64 may consist of cast aluminum, of wood or another suitable pressure-resistant substance. As a rule, such inserts will be made of aluminum if the apparatus of my invention as shown in FIGS. 12–15 is utilized for mass-manufacture of artificial sponges whose configuration resembles the configuration of naturally occurring sponges.

In the event that the apparatus is utilized for the production of small numbers of irregularly configurated unsymmetric homogeneous articles, it is sufficient to make the insert of thermoplastic material which is heated prior to shaping and which is put to use at room temperature so that it can withstand the pressure of a workpiece. Such kneadable thermoplastic substances are well known in the art, and they may be utilized with great advantage when the workpieces consist of elastically deformable foamed plastic material which does not transmit large deforming pressures to the inserts.

The cutter 24 preferably assumes the form of a band saw, a band knife or a similar elongated body which can form in the workpiece a cut in a plane intermediate the opposed surfaces thereof.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. In an apparatus for manufacturing shaped articles with predetermined outline from elastically deformable workpieces of the type having two opposed surfaces and a peripheral face intermediate such surfaces, in combination, a female die having at least one opening whose outline corresponds to the desired outline of the article and having a flat surface which supports one surface of the workpiece in such a way that said one surface of the workpiece covers said opening; deforming means for applying constant pressure of unchanging magnitude to the other surface of the workpiece whereby that portion of the workpiece which covers said opening yields and penetrates into the interior of said die; and cutter means for forming a slit in the peripheral face and in a cutting plane located between the surfaces of the workpiece parallel to said flat surface of said die while that portion of the workpiece which covers said opening penetrates into said die whereby the workpiece is subdivided into a pair of sections the first of which has said one surface and an additional surface located opposite said one surface and provided with a projection whose outline corresponds to the outline of said opening, and the second of which has said other surface and a second surface located opposite said other surface and provided with a cavity which is complementary to said projection, said deforming means comprising a roller of constant diameter having an axis of rotation parallel with the plane of said slit.

2. A combination as set forth in claim 1, further comprising means for moving said die at a given speed in a plane parallel with the plane of said slit and in a direction toward said cutter means, and means for rotating said roller at a peripheral speed which is identical with said given speed.

3. In an apparatus for manufacturing shaped articles with predetermined outline from elastically deformable workpieces of the type having two opposed surfaces and a peripheral face intermediate such surfaces, in combination, a female die having at least one opening whose outline corresponds to the desired outline of the article, said die adapted to support the workpiece in such a way that one surface of the workpiece covers said opening; insert means partially filling said opening; deforming means for applying constant pressure of unchanging magnitude to the other surface of the workpiece whereby that portion of the workpiece which covers said opening yields and penetrates into the interior of said die to the extent determined by the configuration of said insert means; and cutter means for forming a slit in the peripheral face and in a cutting plane located between the surfaces of the workpiece while that portion of the workpiece which covers said opening penetrates into said die whereby the workpiece is subdivided into a pair of sections the first of which has said one surface and an additional surface located opposite said one surface and provided with a projection whose outline corresponds to the outline of said opening and whose configuration is complementary to the configuration of the space available in said opening upon insertion of said insert means, and the second of which has said other surface and a second surface located opposite said other surface and provided with a cavity which is complementary to said projection.

4. A combination as set forth in claim 3, wherein said insert means is removable from said opening.

5. In an apparatus for manufacturing shaped articles with predetermined outline from elastically deformable workpieces of the type having two opposed surfaces and a peripheral face intermediate such surfaces, in combination, a female die having at least one opening whose outline corresponds to the desired outline of the article, said die adapted to support the workpiece in such a way that one surface of the workpiece covers said opening; deforming means comprising a rotary roller for applying constant pressure of unchanging magnitude to the other surface of the workpiece whereby that portion of the workpiece which covers said opening yields and penetrates into the interior of said die; means for moving said die at a given speed along said roller; means for driving said roller at a peripheral speed identical with said given speed; and cutter means for forming a slit in the peripheral face and in a cutting plane located between the surfaces of the workpiece while that portion of the workpiece which covers said opening penetrates into said die whereby the workpiece is subdivided into a pair of sections the first of which has said one surface and an additional surface located opposite said one surface and provided with a projection whose outline corresponds to the outline of said opening, and the second of which has said other surface and a second surface located opposite said other surface and provided with a cavity which is complementary to said projection.

6. A combination as set forth in claim 5, wherein said roller is provided with a peripheral liner of friction-generating material.

7. A combination as set forth in claim 5, wherein said die is located in a horizontal plane and wherein said cutter means is located in a plane making an acute angle with said horizontal plane.

8. A combination as set forth in claim 5, wherein said cutter means is located in a horizontal plane and wherein said die is located in a plane making an acute angle with said horizontal plane.

9. A combination as set forth in claim 5, further comprising stationary supporting means for said die, a carriage for supporting said deforming means and said cutter means at a level above said die, and guide means for said carriage so that the latter is reciprocable along said die.

10. A combination as set forth in claim 5, wherein said deforming means and said cutter means are located above and are adjustable in directions toward and away from said die.

11. A combination as set forth in claim 5, wherein said die is located below and is adjustable in directions toward and away from said deforming means and said cutter means.

12. A combination as set forth in claim 5, further comprising insert means removably received in the opening of said die.

13. In a process for manufacturing shaped articles with predetermined outline from elastically deformable workpieces of the type having two opposed surfaces and a peripheral face intermediate such surfaces, the steps of applying constant pressure of unchanging magnitude to one surface of a workpiece and permitting the other surface to yield to such constant pressure within an outline which corresponds to the desired outline of the article; slitting the workpiece by forming in the peripheral face thereof a cut which divides the workpiece into a pair of sections the first of which has said one surface and a second surface located opposite said one surface and provided with a cavity, and the second of which has said other surface and an additional surface located opposite said other surface and provided with a projection which is complementary to said cavity and whose outline corresponds to the desired outline of the article; applying constant pressure of unchanging magnitude to said other surface of said second section and simultaneously permitting said projection to yield to such constant pressure; and forming a cut in the plane of said additional surface to separate said projection and a portion of the remainder of said second section from said second section.

References Cited by the Examiner

UNITED STATES PATENTS

| | | |
|---|---|---|
| 2,404,731 | 7/46 | Johnson. |
| 2,902,091 | 9/59 | Dahla. |

FOREIGN PATENTS

| | | |
|---|---|---|
| 552,739 | 12/56 | Belgium. |
| 315,579 | 7/29 | Great Britain. |
| 572,515 | 1/58 | Italy. |

ANDREW R. JUHASZ, *Primary Examiner.*

MORRIS LIEBMAN, *Examiner.*